（12） United States Patent
Xing et al.

(10) Patent No.: US 12,520,730 B2
(45) Date of Patent: Jan. 6, 2026

(54) SOT-DRIVEN FIELD-FREE SWITCHING MRAM AND ARRAY THEREOF

(71) Applicant: INSTITUTE OF MICROELECTRONICS, CHINESE ACADEMY OF SCIENCES, Beijing (CN)

(72) Inventors: Guozhong Xing, Beijing (CN); Huai Lin, Beijing (CN); Yu Liu, Beijing (CN); Peiwen Zhang, Beijing (CN); Changqing Xie, Beijing (CN); Ling Li, Beijing (CN); Ming Liu, Beijing (CN)

(73) Assignee: INSTITUTE OF MICROELECTRONICS, CHINESE ACADEMY OF SCIENCES, Beijing (CN)

( * ) Notice: Subject to any disclaimer, the term of this patent is extended or adjusted under 35 U.S.C. 154(b) by 409 days.

(21) Appl. No.: 18/042,249

(22) PCT Filed: Aug. 20, 2020

(86) PCT No.: PCT/CN2020/110217
§ 371 (c)(1),
(2) Date: Feb. 20, 2023

(87) PCT Pub. No.: WO2022/036623
PCT Pub. Date: Feb. 24, 2022

(65) Prior Publication Data
US 2023/0337548 A1    Oct. 19, 2023

(51) Int. Cl.
*H10N 50/20*    (2023.01)
*G06F 7/501*    (2006.01)
(Continued)

(52) U.S. Cl.
CPC .............. *H10N 50/20* (2023.02); *G06F 7/501* (2013.01); *G11C 11/161* (2013.01); *H10B 61/10* (2023.02);
(Continued)

(58) Field of Classification Search
CPC ........ H10N 50/20; H10N 50/85; G06F 7/501; G11C 11/161; G11C 11/1673; G11C 11/1675; H10B 61/10
(Continued)

(56) References Cited

U.S. PATENT DOCUMENTS 9,324,402 B2 *    4/2016    Wu ..................... G11C 11/1675
10,236,075 B1 *    3/2019    Kim ........................ G11C 29/76
(Continued)

FOREIGN PATENT DOCUMENTS

CN    107039064 A    8/2017
CN    109075210 A    12/2018
(Continued)

OTHER PUBLICATIONS

International Search Report and Written Opinion for Chinese PCT Application No. PCT/CN2020/110217, dated May 19, 2021. 9 pages including English translation.

*Primary Examiner* — Jami Valentine Miller
(74) *Attorney, Agent, or Firm* — Christopher R. Christenson; Kelly, Holt & Christenson, P.L.L.C.

(57) ABSTRACT

An SOT-driven field-free switching MRAM and an array thereof. From top to bottom, the SOT-MRAM sequentially includes: a selector (1) configured to turn on or turn off the SOT-MRAM under an action of an external voltage; a magnetic tunnel junction (2), including a ferromagnetic reference layer, a tunneling layer and a ferromagnetic free layer arranged sequentially from top to bottom; and a spin-orbit coupling layer (3) made of one or more selected (Continued)

from heavy metal, doped heavy metal, heavy metal alloy, metal oxide, dual heavy metal layers, semiconductor material, two-dimensional semi-metal material and anti-ferromagnetic material. The spin-orbit coupling layer is configured to generate an in-plane effective field in the ferromagnetic free layer by using the interlayer exchange coupling effect and generate spin-orbit torques by using the spin Hall effect, so as to perform a deterministic data storage in the magnetic tunnel junction (2).

9 Claims, 6 Drawing Sheets (51) Int. Cl.
G11C 11/16 (2006.01)
H10B 61/00 (2023.01)
H10N 50/85 (2023.01)

(52) U.S. Cl.
CPC .......... *H10N 50/85* (2023.02); *G11C 11/1673* (2013.01); *G11C 11/1675* (2013.01)

(58) Field of Classification Search
USPC ....................................................... 257/421
See application file for complete search history.

(56) References Cited

U.S. PATENT DOCUMENTS

| | | | | |
|---|---|---|---|---|
| 11,514,963 | B2* | 11/2022 | Drouard | H10N 50/10 |
| 12,260,089 | B2* | 3/2025 | Park | G06F 3/0613 |
| 2006/0105990 | A1* | 5/2006 | Stahl | A61K 31/7012 |
| | | | | 514/61 |
| 2017/0117027 | A1* | 4/2017 | Braganca | H10B 61/10 |
| 2019/0006415 | A1* | 1/2019 | Li | G11C 11/1673 |
| 2019/0147929 | A1 | 5/2019 | Sasaki et al. | |
| 2019/0148046 | A1* | 5/2019 | Suzuki | H01F 10/324 |
| | | | | 327/552 |
| 2020/0075099 | A1* | 3/2020 | Choi | G11C 11/1659 |
| 2020/0082861 | A1* | 3/2020 | Sasaki | H01F 10/3254 |
| 2020/0273512 | A1* | 8/2020 | Petti | G11C 11/1693 |
| 2021/0210127 | A1* | 7/2021 | Drouard | G11C 11/1675 |

FOREIGN PATENT DOCUMENTS

| | | |
|---|---|---|
| CN | 109637569 A | 4/2019 |
| CN | 111554809 A | 8/2020 |

\* cited by examiner

SOT-DRIVEN FIELD-FREE SWITCHING MRAM AND ARRAY THEREOF

CROSS REFERENCE

This application is a Section 371 National Stage Application of International Application No. PCT/CN2020/110217 filed on Aug. 20, 2020, the whole disclosure of which is incorporated herein by reference in its entirety.

TECHNICAL FIELD

This disclosure pertains to the field of magnetic storage technology, specifically addressing an SOT-driven field-free switching MRAM, and an array thereof.

BACKGROUND

With the continuous development of researches on storage media, the magnetic random access memory (MARM) based on the physical phenomenon of spin has attracted widespread attention due to its superior performance. In spin-orbit torques magnetic random access memory (SOT-MRAM), a charge current is introduced into a word line, and a spin current is generated by the spin-orbit coupling effect of the word line and injected into a ferromagnetic free layer of a magnetic tunnel junction (MTJ). Only under an action of an external magnetic field, the spin current may drive a controllable switching of a magnetization direction of the ferromagnetic free layer through spin-orbit torques, so that information can be written. The SOT-MRAM in the related art requires the external magnetic field to break the symmetry to realize a deterministic magnetization switching. The external magnetic field makes it difficult to realize an integration of the SOT-MRAM. In addition, a three-terminal device structure of the SOT-MRAM makes an area of a storage unit larger, which is not suitable for the three-dimensional integration of devices and is not conducive to improving a capacity of the SOT-MRAM.

SUMMARY

Technical Problems to be Solved

The present disclosure introduces an SOT-driven field-free switching MRAM, and an array thereof. A ferromagnetic layer exhibits perpendicular anisotropy and field-free switching, enabling three-dimensional integration in SOT-MRAM technology.

Technical Solutions

An SOT-driven field-free switching MRAM is provided by the present disclosure, wherein from top to bottom, the SOT-MRAM sequentially includes: a selector 1 configured to turn on or turn off the SOT-MRAM under an action of an external voltage; a magnetic tunnel junction 2, including a ferromagnetic reference layer 201, a tunneling layer 202 and a ferromagnetic free layer 203 arranged sequentially from top to bottom; and a spin-orbit coupling layer 3 made of one or more selected from heavy metal, doped heavy metal, heavy metal alloy, metal oxide, dual heavy metal layers, semiconductor material, two-dimensional semi-metal material and anti-ferromagnetic material, wherein the spin-orbit coupling layer is configured to generate an in-plane effective field in the ferromagnetic free layer 203 by using the interlayer exchange coupling effect and generate spin-orbit torques by using the spin Hall effect, so as to perform a deterministic data storage in the magnetic tunnel junction 2.

Optionally, a magnetization direction of a magnetic material in the ferromagnetic free layer 203 is perpendicular to a plane where the ferromagnetic material is located.

Optionally, the selector 1 is a metal-semiconductor-metal structure made of a two-dimensional van der Waals material, and the external voltage is an external forward voltage or an external reverse voltage.

Optionally, the two-dimensional van der Waals material is $WS_2$ or $WSe_2$.

Optionally, the ferromagnetic reference layer 201 and the ferromagnetic free layer 203 are made of CoFeB, Co or NiFe.

Optionally, the tunneling layer 202 is made of MgO.

Optionally, in the spin-orbit coupling layer 3, the heavy metal is made of one or more of Pt, Pd, Hf, β-Ta and β-W; the heavy metal alloy is made of one or more of $Pt_{80}Al_{20}$, $Pt_{85}Hf_{15}$ and $Pt_{75}Au_{25}$; the metal oxide is made of one or more of $W_{88}O_{12}$ and $PtO_2$; the anti-ferromagnetic material is made of one or more of PtMn, FeMn, PdMn and IrMn; the semiconductor material is (Ga, Mn)As; and the two-dimensional semi-metal material is made of one or more of $WTe_2$, $MoTe_2$ and $PtTe_2$.

Optionally, the SOT-MRAM further includes: a bit line 4 located above the selector 1, wherein the bit line is configured to output the data stored in the SOT-MRAM.

An array formed by the SOT-driven field-free switching MRAMs described above is also provided by the present disclosure, wherein the array is an array structure of M rows, N columns and K layers including M×N×K SOT-MRAMs, and spin-orbit coupling layers 3 of each row of SOT-MRAMs are connected to a corresponding common word line 5, where M, N and K are positive integers.

Optionally, the array is the three-dimensional array when K is greater than 1, in two adjacent layers of SOT-MRAMs, a bit line 4 in a bottom layer of SOT-MRAMs and the common word line 5 in a top layer of SOT-MRAMs cross at an interval.

Beneficial Effects

The SOT-driven field-free switching MRAM and the array thereof provided by the present disclosure have the following beneficial effects.

(1) by providing the spin-orbit coupling layer on the ferromagnetic free layer side of the magnetic tunnel junction, a perpendicular anisotropy and an SOT-driven field-free switching of the ferromagnetic layer are realized in the SOT-MRAM;

(2) by providing the selector to control the on-off of the SOT-MRAM under the action of the external voltage, a scalability of a device is improved while a power consumption during use of the device is reduced;

(3) the three-dimensional integrated architecture of the SOT-MRAM array avoids read-write interference and increases the data storage density of the SOT-MRAM; and (4) the SOT-MRAM and the array thereof may be fabricated using the existing CMOS process, and technical challenges faced by the SOT-MRAM in production is solved.

REFERENCE NUMERALS

1—selector;
2—magnetic tunnel junction;
201—ferromagnetic reference layer;
202—tunneling layer;
203—ferromagnetic free layer;
3—spin-orbit coupling layer;
4—bit line;
5—common word line;
6—pre-charge sense amplifier;
61—first pre-charge sense amplifier;
62—second pre-charge sense amplifier;
71—first logic tree;
72—second logic tree;
8—storage unit;
9—write logic operation circuit.

DETAILED DESCRIPTION OF EMBODIMENTS

In order to make objectives, technical solutions and advantages of the present disclosure clearer, the present disclosure will be further described in detail below in combination with specific embodiments and with reference to the accompanying drawings.

Figure 1:
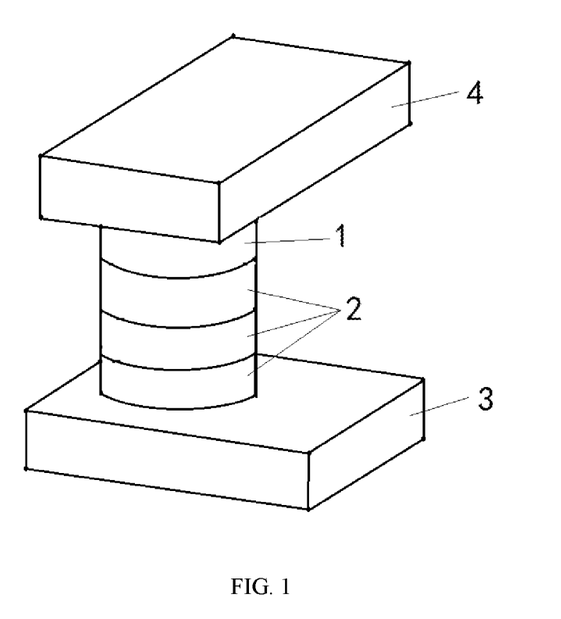
FIG. 1 schematically shows a schematic structural diagram of an SOT-driven field-free switching MRAM provided by the embodiments of the present disclosure.

FIG. 1 schematically shows a schematic structural diagram of an SOT-driven field-free switching MRAM provided by the embodiments of the present disclosure. Referring to FIG. 1, a structure shown in FIG. 1 will be described in detail with reference to FIG. 2 to FIG. 5.

Referring to FIG. 1, an SOT-MRAM includes a bit line 4, a selector 1, a magnetic tunnel junction 2 and a spin-orbit coupling layer 3 arranged sequentially from top to bottom.

The selector 1 is applied with an external voltage and turns on or turns off the SOT-MRAM under an action of the external voltage. The selector 1 is a metal-semiconductor-metal structure made of a two-dimensional van der Waals material. The two-dimensional van der Waals material is tungsten disulfide ($WS_2$) or tungsten diselenide ($WSe_2$). The formed selector 1 is a two-dimensional material-based selector. It should be noted that in the embodiment, other two-dimensional materials having the same physical properties as $WS_2$ and $WSe_2$ may also be selected to form the selector 1. The selector 1 may turn on or turn off the SOT-MRAM under the action of an external forward voltage or an external reverse voltage, that is, it has a bidirectional threshold conduction property. Taking the external forward voltage as an example, when a forward voltage applied to the selector 1 is greater than a turn-on voltage, the selector 1 is in an on state, thereby the SOT-MRAM is turned on. When the forward voltage applied to the selector 1 is less than a turn-off threshold voltage, the selector 1 is in an off state, thereby the SOT-MRAM is turned off. When the forward voltage applied to the selector 1 is between the turn-on voltage and the turn-off threshold voltage, the state of the selector 1 remains unchanged, and the state of the SOT-MRAM remains unchanged as well. The turn-off threshold voltage is, for example, half of the turn-on voltage.

The magnetic tunnel junction 2 includes a ferromagnetic reference layer 201, a tunneling layer 202 and a ferromagnetic free layer 203 arranged sequentially from top to bottom. The ferromagnetic reference layer 201 and the ferromagnetic free layer 203 are made of alloys such as cobalt iron boron (CoFeB), cobalt (Co) or nickel iron (NiFe), etc., and the tunneling layer 202 is made of magnesium oxide (MgO). A magnetization direction of a magnetic material in the ferromagnetic free layer 203 is perpendicular to a plane where the ferromagnetic material is located, so that the ferromagnetic free layer 203 is magnetized out of the plane, which is conducive for reducing a size of the device and improving a switching efficiency of the device. In the embodiment, the magnetic tunnel junction 2 may be fabricated using an existing magnetic tunnel junction device integration CMOS process, and technical challenges faced by the SOT-MRAM in production may be solved. In the embodiment, shapes of the selector 1 and the magnetic tunnel junction 2 may be, for example, cylindrical, rectangular, annular and the like.

The spin-orbit coupling layer 3 contains one or more selected from heavy metal, doped heavy metal, heavy metal alloy, metal oxide, dual heavy metal layers, semiconductor material, two-dimensional semi-metal material, and anti-ferromagnetic material. The heavy metal is made of one or more of Pt, Pd, Hf, β-Ta, and β-W; the heavy metal alloy contains one or more of $Pt_{80}Al_{20}$, $Pt_{85}Hf_{15}$ and $Pt_{75}Au_{25}$; the metal oxide contains one or more of $W_{88}O_{12}$ and $PtO_2$; the anti-ferromagnetic material contains one or more of PtMn, FeMn, PdMn and IrMn; the semiconductor material is (Ga, Mn)As; and the two-dimensional semi-metal material contains one or more of $WTe_2$, $MoTe_2$ and $PtTe_2$.

The spin-orbit coupling layer 3 generates an exchange coupling field in the ferromagnetic free layer 203 by using the interlayer exchange coupling (IEC) effect, so that the magnetic free layer 203 maintains a strong perpendicular anisotropy. At the same time, the spin-orbit coupling layer generates the spin-orbit coupling effect to provide a spin current when a current flows, the spin-orbit coupling layer has interlayer coupling with the MTJ free layer, providing an effective field for switching of the ferromagnetic material, and having a strong SOT effect. Therefore, in the embodiment, not only spin-orbit torques is generated by the spin-orbit coupling layer 3 by using the spin Hall effect, but an in-plane effective field is also inductively generated in the ferromagnetic free layer 203 by the spin-orbit coupling layer by using the interlayer exchange coupling effect, so as to perform a deterministic storage of data in the magnetic tunnel junction 2, which eliminates an external magnetic field needed in the traditional SOT-MRAM. An enhanced exchange coupling field may generate two types of domain walls with opposite chirality, and the two types of domain walls move in opposite directions to realize the field-free switching. The bit line 4 is located above the selector 1, and is used to output the data stored in the SOT-MRAM.

Figure 2:
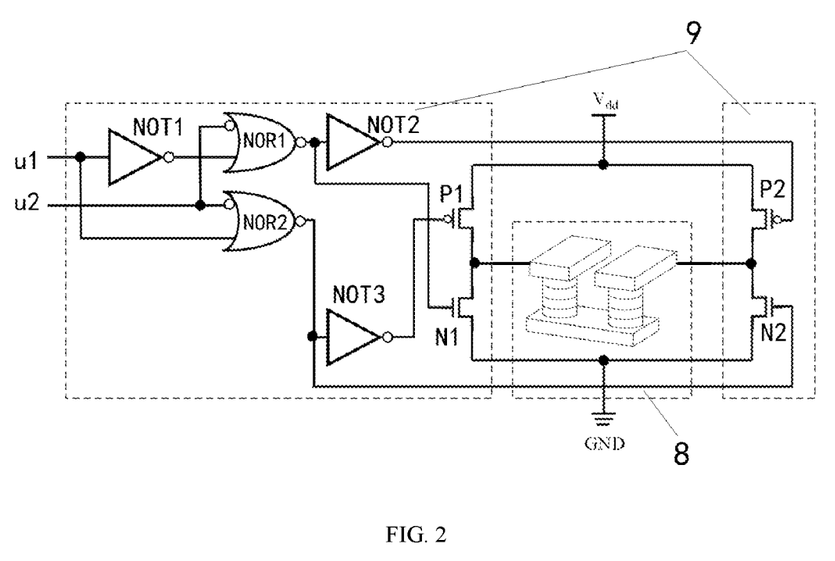
FIG. 2 schematically shows a schematic structural diagram of an inverter write operation circuit formed by the SOT-MRAM shown in FIG. 1.

FIG. 2 shows an inverter write operation circuit formed by the SOT-MRAM shown in FIG. 1. The inverter write operation circuit includes a storage unit 8 and a write logic operation circuit 9. The storage unit 8 includes two SOT- MRAMs. Spin-orbit coupling layers 3 of the two SOT-MRAMs are connected with each other, and ferromagnetic reference layers of the two SOT-MRAMs have opposite magnetization directions, so that binary numbers written in the two are complementary. That is, when "0" is written in one SOT-MRAM, "1" is written in the other SOT-MRAM. The storage unit in the embodiment effectively solves a problem of low tunnel magnetoresistance in the traditional SOT-MRAM, and a highly reliable read operation is realized.

Referring to FIG. 2, the write logic operation circuit 9 has two input terminals u1 and u2. The u2 is an enable terminal of the inverter write operation circuit. A high level is valid, and the inverter write operation circuit is in a normal write state. A low level is invalid, and the inverter write operation circuit does not operate. An electrical signal input to the u1 terminal is used to control turn-on and turn-off of four MOS transistors P1, P2, N1 and N2, so as to control a flow direction of a current flowing through the storage unit 8, thereby controlling information writing in the storage unit 8. Specifically, when the u1 terminal is at a high level, after transformations of two NOR gates (NOR1, NOR2) and three NOT gates (NOT1, NOT2, NOT3) in the write logic operation circuit 9, the MOS transistors P2 and N1 are in an on state, the MOS transistors P1 and N2 are in an off state, and the current flows through magnetic tunnel junctions in the two SOT-MRAMs of the storage unit 8 from right to left. Since the spin-orbit coupling layers 3 in the two SOT-MRAMs are connected in series with each other and the magnetization directions of the ferromagnetic reference layers are opposite to each other, the magnetization directions shown in FIG. 2 are taken as an example, in which "1" is written in the right magnetic tunnel junction, and "0" is written in the left magnetic tunnel junction. When the u1 terminal is at a low level, after the transformations of two NOR gates and the three NOT gates in the write logic operation circuit 9, the MOS transistors P1 and N2 are in the on state, the MOS transistors P2 and N1 are in the off state, and the current flows through the magnetic tunnel junctions in the two SOT-MRAMs of the storage unit 8 from left to right. Since the spin-orbit coupling layers 3 in the two SOT-MRAMs are connected in series with each other and the magnetization directions of the ferromagnetic reference layers are opposite to each other, the magnetization directions shown in FIG. 2 are taken as an example, in which "0" is written in the right magnetic tunnel junction, and "1" is written in the left magnetic tunnel junction. Different binary information are written in the right magnetic tunnel junction and the left magnetic tunnel junction. When "0" is written in one, "1" is written in the other, so that a reverse write operation function is realized.

Figure 3:
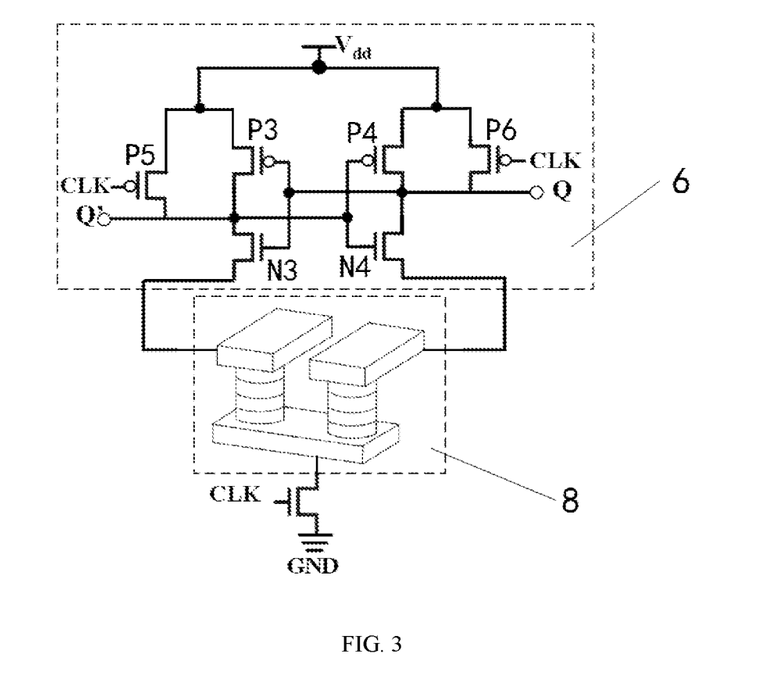
FIG. 3 schematically shows a schematic structural diagram of a read operation circuit formed by the SOT-MRAM shown in FIG. 1.

FIG. 3 shows a read operation circuit formed by the SOT-MRAM shown in FIG. 1. The read operation circuit consists of a storage unit 8 and a PCSA (Pre-Charge Sense Amplifier) 6. The pre-charge sense amplifier 6 and the storage unit 8 are connected in series.

Referring to FIG. 3, when a clock signal CLK in the pre-charge sense amplifier 6 turns to "0", MOS transistors P3, P4, N3 and N4 in the pre-charge sense amplifier 6 are turned on, and the pre-charge sense amplifier 6 is pre-charged by a voltage Vdd. When the clock signal CLK turns from "0" to "1", MOS transistors P5 and P6 in the pre-charge sense amplifier 6 are turned on, Q terminal and Q' terminal in the pre-charge sense amplifier 6 discharge, the Q terminal outputs "0" or "1", and an output of the Q' terminal is opposite to that of the Q terminal. The outputs of the Q terminal and the Q' terminal are determined by resistance values of the magnetic tunnel junctions in the two SOT-MRAMs of the storage unit 8. Specifically, if the magnetic tunnel junction in the left SOT-MRAM is in a high resistance state (the stored data is "0") and the magnetic tunnel junction in the right SOT-MRAM is in a low resistance state (the stored data is "1"), when the clock signal CLK turns from "0" to "1", a discharge speed of the Q terminal is greater than that of the Q' terminal. When the voltage of the Q terminal drops below an on-off threshold voltage of the inverter (provided between the Q terminal and the Q' terminal), the Q' terminal is quickly charged to high level "1", and the Q terminal continues to discharge and outputs "0". At this time, the Q terminal and the Q' terminal output "0" and "1", respectively. If the magnetic tunnel junction in the left SOT-MRAM is in a low resistance state (the stored data is "1") and the magnetic tunnel junction in the right SOT-MRAM is in a high resistance state (the stored data is "0"), when the clock signal CLK turns from "0" to "1", a discharge speed of the Q terminal is less than that of the Q' terminal. When the voltage of the Q' terminal drops below the turning threshold voltage of the inverter, the Q terminal is quickly charged to high level "1", and the Q' terminal continues to discharge and outputs "0". At this time, the Q terminal and the Q' terminal output "1" and "0", respectively. It can be learnt that the Q terminal outputs the data stored in the magnetic tunnel junction of the left SOT-MRAM, and the Q' terminal outputs the data stored in the magnetic tunnel junction of the right SOT-MRAM, so that a function of reading the information stored in the storage unit 8 may be realized.

Figure 4:
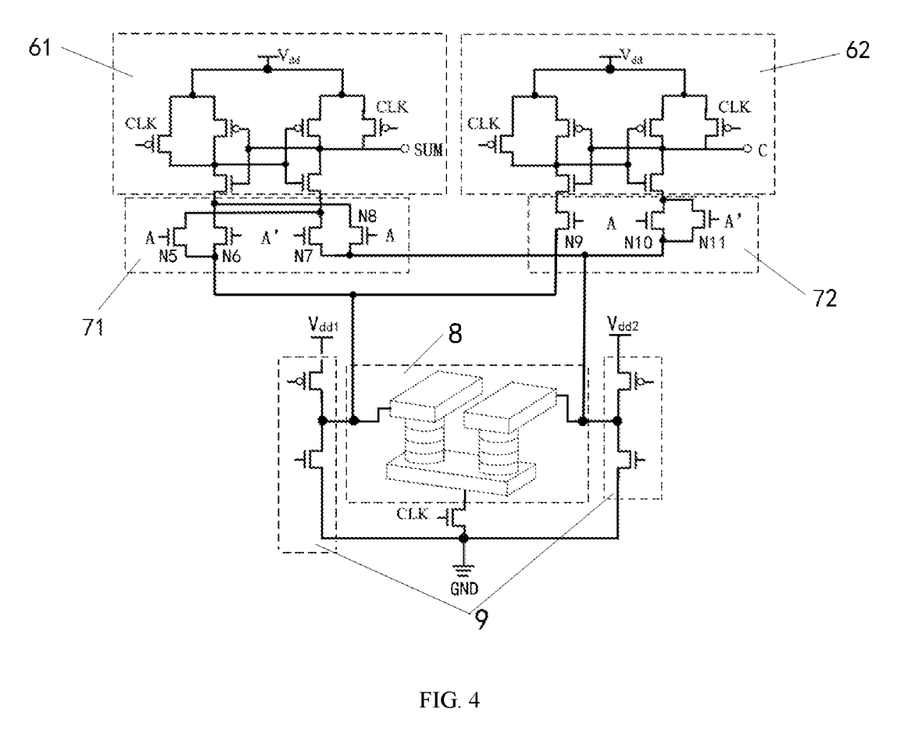
FIG. 4 schematically shows a schematic structural diagram of a half adder circuit formed by the SOT-MRAM shown in FIG. 1.

FIG. 4 shows a half adder circuit formed by the SOT-MRAM shown in FIG. 1. The half adder circuit includes a storage unit 8, a write logic operation circuit 9, a first pre-charge sense amplifier 61, a second pre-charge sense amplifier 62, a first logic tree 71, and a second logic tree 72. Signals input to two input terminals of the half adder circuit are respectively a signal B written in the magnetic tunnel junction of the left SOT-MRAM of the storage unit 8 and a signal A input to the first logic tree 71 and the second logic tree 72. A sum bit of the half adder circuit is an output terminal SUM, a carry bit of the half adder circuit is an output terminal C, and a logic expression of the output terminal SUM is S=A⊕B,C=A·B.

Referring to FIG. 4, the first logic tree 71 and the first pre-charge sense amplifier 61 consist a sum operation SUM structure of the half adder, and the second logic tree 72 and the second pre-charge sense amplifier 62 consist a carry operation C structure of the half adder. The two operation structures are connected in series with the storage unit 8, respectively. Signal A and signal A' are gate control signals of transistors in the first logic tree 71 and the second logic tree 72, and signal B and signal B' are information stored in the two SOT-MRAMs in the storage unit 8. Take "AB" corresponding to a numerical value "00" as an example, A=0, A'=1, transistors (N5, N8, N9, N10) controlled by the signal A are in an off state, and transistors (N6, N7, N11) controlled by the signal A' are in an on state. When the clock signal CLK turns from "0" to "1", B=0, B'=1, the left SOT-MRAM is in a high resistance state, and the right SOT-MRAM is in a low resistance state. The discharge speed of the left SOT-MRAM is less than that of the right SOT-MRAM, and the SUM terminal in the first pre-charge sense amplifier 61 is set to "0", that is, SUM=0. Similarly, when "AB" corresponds to numerical values "01", "10" and "11", output values of the SUM terminal in the first pre-charge sense amplifier 61 are "1", "1" and "0", respectively, and the SUM terminal realizes a XOR logic operation between "A" and "B", that is, S=A⊕B. Still taking "AB" corresponding to the numerical value "00" as the example, A=0, A'=1, then the transistors controlled by the signal A are in the off state, and the transistors controlled by the signal A' are in the on state. When the clock signal CLK turns from "0" to "1", B=0, B'=1, the left SOT-MRAM is in a high resistance state, the right SOT-MRAM is in the low resistance state, the discharge speed of the left SOT-MRAM is less than that of the right SOT-MRAM, and the C terminal in the second pre-charge sense amplifier 62 is set to "0", that is, C=0. Similarly, when "AB" corresponds to numerical values "01", "10" and "11", output values of the C terminal in the second pre-charge sense amplifier 62 are "0", "0" and "1", respectively, and the C terminal realizes an AND logic operation between "A" and "B", that is, C=A·B.

Figure 5A:
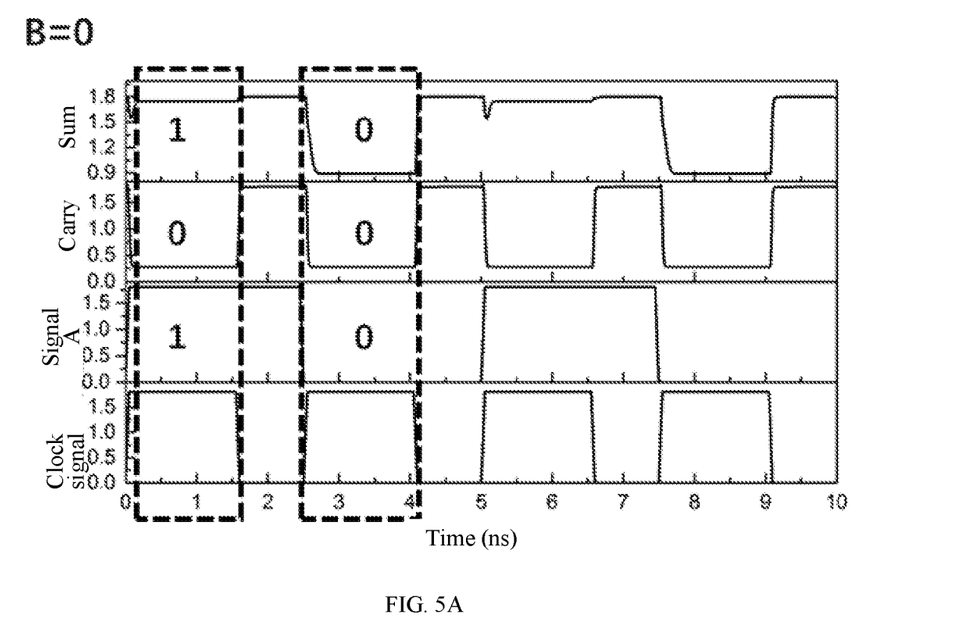
FIG. 5A and FIG. 5B schematically show operation results of the half adder circuit shown in FIG. 4 when "0" and "1" are stored in the SOT-MRAM, respectively.
Figure 5B:
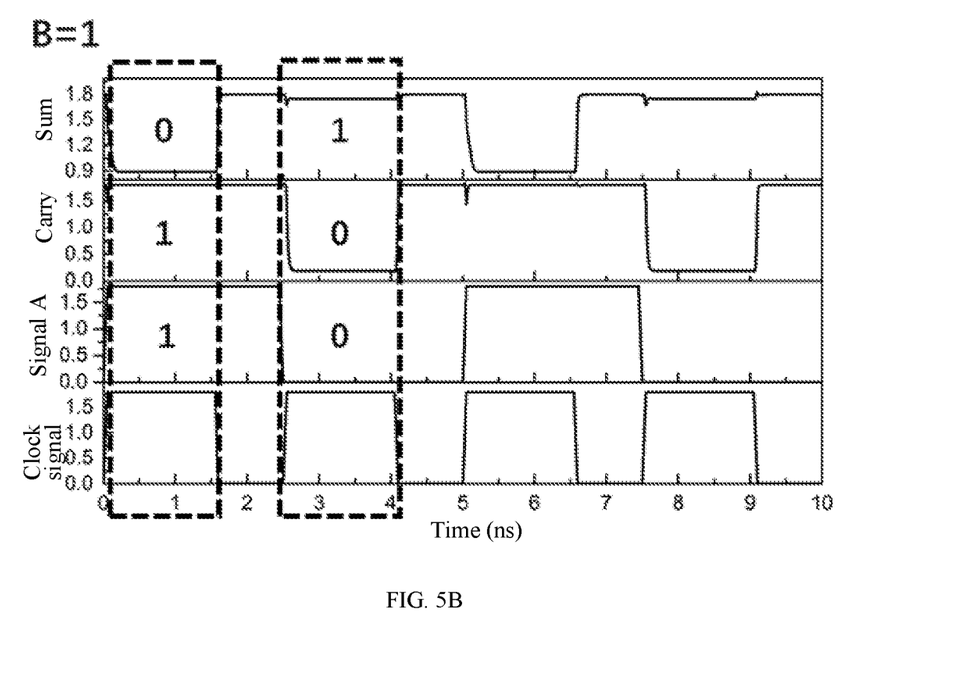

FIG. 5A shows a result of a logic operation with the signal A when the information B=0 is stored in the SOT-MRAM, and FIG. 5B shows a result of a logic operation with the signal A when the information B=1 is stored in the SOT-MRAM. When the clock signal CLK comes, the signal A performs logic operations with the stored signal to respectively realize an XOR logic that outputs "Sum" and an AND logic that outputs "Carry", so as to realize the function of the half adder.

Figure 6:
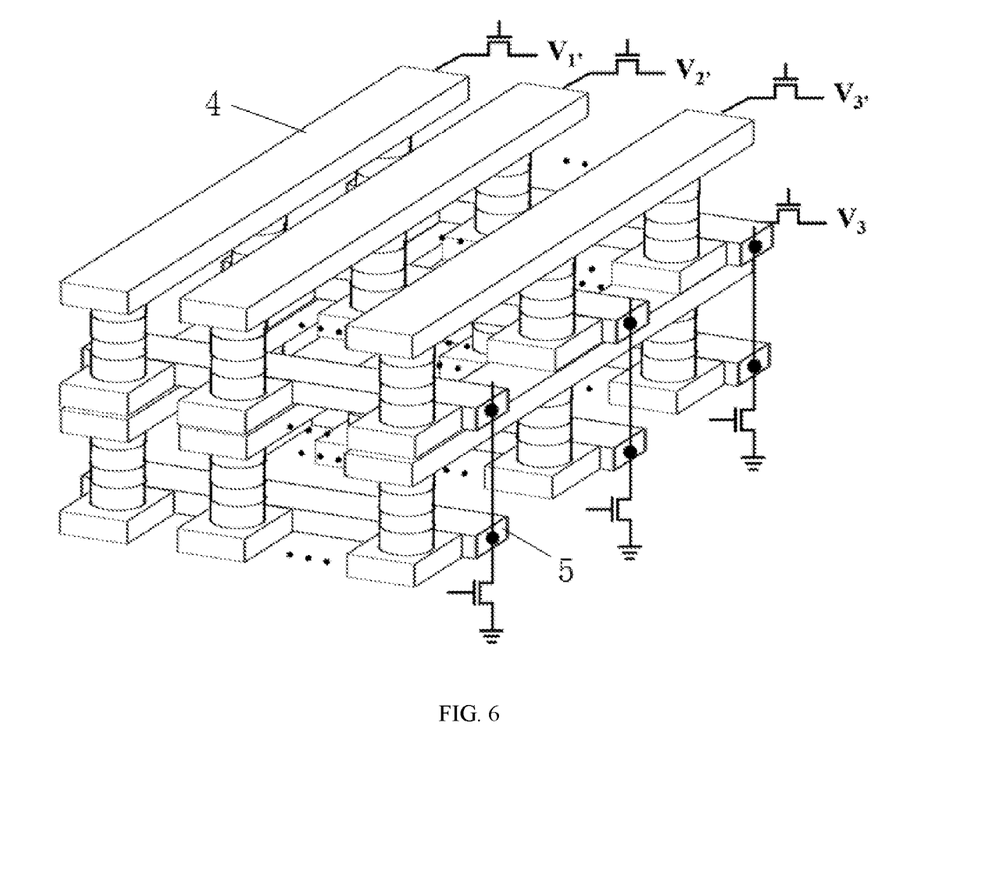
FIG. 6 schematically shows a schematic structural diagram of the three-dimensional integration of SOT-driven field-free switching MRAMs provided by the embodiments of the present disclosure.

FIG. 6 schematically shows a schematic structural diagram of an SOT-driven field-free switching MRAM array provided by the embodiments of the present disclosure. An SOT-MRAM array includes M×N×K SOT-MRAMs in the embodiment shown in FIG. 1, and the M×N×K SOT-MRAMs form an array structure of M rows, N columns and K layers, where M, N and K are positive integers. In the SOT-MRAM array, spin-orbit coupling layers 3 of each row of SOT-MRAMs are connected to a corresponding common word line 5, a total of N×K common word lines 5 are provided, and N common word lines 5 in a same row in different layers are connected with each other and connected to a corresponding transistor. Bit lines of each column of SOT-MRAMs are connected with each other and connected to a corresponding selective transistor. By controlling the on-off of the transistor connected to the common word line 5 and the selective transistor connected to the bit line 4, the corresponding SOT-MRAM in the array is selected to be turned on, so that read and write operations are performed on the SOT-MRAM in the on state. The unselected SOT-MRAM is controlled to be in the off state, so that a leakage current of the SOT-MRAM that is not turned on is reduced, thus reducing a power consumption in the array. The common word line 5 is a Ta word line. By using the Ta word line, an SOT-dominated switching mode is formed in a dual-terminal SOT-MRAM device and an array thereof, so as to realize a dual-terminal SOT-MRAM structure.

When K is 1, the formed array is a two-dimensional array structure. When K is greater than 1, the formed array is the three-dimensional array structure, and in two adjacent layers of SOT-MRAMs, the bit lines 4 in a bottom layer of SOT-MRAMs and the common word lines 5 in a top layer of SOT-MRAMs cross at intervals, so that a read-write interference is avoided, and the data storage density of the SOT-MRAM is increased.

In the SOT-driven field-free switching MRAM provided in the embodiments of the present disclosure, the interlayer spin-orbit coupling layer is provided on a ferromagnetic free layer interface side of the magnetic tunnel junction. The spin-orbit coupling layer is made of one or more selected from heavy metal, doped heavy metal, heavy metal alloy, metal oxide, dual heavy metal layers, semiconductor material, two-dimensional semi-metal material, and anti-ferromagnetic material. Not only the in-plane effective field is generated in the ferromagnetic free layer by the spin-orbit coupling layer by using the interlayer exchange coupling effect, but also the spin-orbit torque is generated by the spin-orbit coupling layer by using the spin Hall effect, so as to perform the deterministic data storage in the magnetic tunnel junction, so that the SOT-MRAM may realize the perpendicular anisotropy of the ferromagnetic free layer and the field-free magnetization switching of SOT without heavy metal materials. The selector is provided to control the on-off of the SOT-MRAM, so that a scalability of the device is improved, while the leakage current of the SOT-MRAM that is not turned on is reduced, thus reducing the power consumption in the array. In addition, the dual-terminal SOT-MRAM device is simple in structure, and a material system thereof is compatible with the CMOS process, which is conducive to large-scale fabrication and integration.

The specific embodiments described above further describe the objectives, technical solutions and beneficial effects of the present disclosure in detail. It should be understood that the above descriptions are merely specific embodiments of the present disclosure, and are not intended to limit the present disclosure. Any modifications, equivalent replacements, improvements, etc., made within the spirit and principle of the present disclosure should fall within the protection scope of the present disclosure.

What is claimed is:

1. An SOT-driven field-free switching MRAM, wherein from top to bottom, the SOT-MRAM sequentially comprises:
   a selector configured to turn on or turn off the SOT-MRAM under an action of an external voltage;
   a magnetic tunnel junction, comprising a ferromagnetic reference layer, a tunneling layer and a ferromagnetic free layer arranged sequentially from top to bottom; and
   a spin-orbit coupling layer made of one or more selected from heavy metal, doped heavy metal, heavy metal alloy, metal oxide, dual heavy metal layers, semiconductor material, two-dimensional semi-metal material and anti-ferromagnetic material, wherein the spin-orbit coupling layer is configured to generate an in-plane effective field in the ferromagnetic free layer by using the interlayer exchange coupling effect and generate spin-orbit torques by using the spin Hall effect, so as to perform a deterministic data storage in the magnetic tunnel junction,
   wherein the selector is a metal-semiconductor-metal structure made of a two-dimensional van der Waals material, and the external voltage is an external forward voltage or an external reverse voltage.

2. The SOT-driven field-free switching MRAM according to claim 1, wherein a magnetization direction of a magnetic material in the ferromagnetic free layer is perpendicular to a plane where the ferromagnetic material is located.

3. The SOT-driven field-free switching MRAM according to claim 1, wherein the two-dimensional van der Waals material is $WS_2$ or $WSe_2$.

4. The SOT-driven field-free switching MRAM according to claim 1, wherein the ferromagnetic reference layer and the ferromagnetic free layer are made of CoFeB, Co or NiFe.

5. The SOT-driven field-free switching MRAM according to claim 1, wherein the tunneling layer is made of MgO.

6. The SOT-driven field-free switching MRAM according to claim 1, wherein in the spin-orbit coupling layer, the heavy metal is made of one or more of Pt, Pd, Hf, β-Ta and β-W; the heavy metal alloy is made of one or more of $Pt_{80}Al_{20}$, $Pt_{85}Hf_{15}$ and $Pt_{75}Au_{25}$; the metal oxide comprises one or more of $W_{88}O_{12}$ and $PtO_2$; the anti-ferromagnetic material is made of one or more of PtMn, FeMn, PdMn and IrMn; the semiconductor material is (Ga, Mn) As; and the two-dimensional semi-metal material is made of one or more of $WTe_2$, $MoTe_2$ and $PtTe_2$.

7. The SOT-driven field-free switching MRAM according to claim 1, wherein the SOT-MRAM further comprises:
   a bit line located above the selector, wherein the bit line is configured to output the data stored in the SOT-MRAM.

8. An array formed by the SOT-driven field-free switching MRAMs according to claim 1, wherein the array is an array structure of M rows, N columns and K layers comprising M×N×K SOT-MRAMs, and spin-orbit coupling layers of each row of SOT-MRAMs are connected to a corresponding common word line, where M, N and K are positive integers.

9. The array according to claim 8, wherein the array is the three-dimensional array when K is greater than 1, in two adjacent layers of SOT-MRAMs, a bit line in a bottom layer of SOT-MRAMs and the common word line in a top layer of SOT-MRAMs cross at an interval.

\* \* \* \* \*